(12) United States Patent
Van Der Molen

(10) Patent No.: US 10,159,366 B2
(45) Date of Patent: Dec. 25, 2018

(54) CONTAINER CLOSURE ASSEMBLIES

(71) Applicant: IPN IP B.V., Houten (NL)

(72) Inventor: Peter Jan Van Der Molen, The Hague (NL)

(73) Assignee: Scholle IPN IP B.V., Houten (NL)

( * ) Notice: Subject to any disclaimer, the term of this patent is extended or adjusted under 35 U.S.C. 154(b) by 526 days.

(21) Appl. No.: 14/843,822

(22) Filed: Sep. 2, 2015

(65) Prior Publication Data

US 2015/0374153 A1  Dec. 31, 2015

Related U.S. Application Data

(62) Division of application No. 14/388,288, filed as application No. PCT/NL2013/050224 on Mar. 27, 2013, now Pat. No. 9,145,237.

(30) Foreign Application Priority Data

Mar. 29, 2012  (NL) .................................... 2008558

(51) Int. Cl.
  *B65D 41/04*   (2006.01)
  *A47G 19/22*   (2006.01)
  (Continued)

(52) U.S. Cl.
  CPC ..... *A47G 19/2266* (2013.01); *B29D 99/0096* (2013.01); *B65B 55/10* (2013.01);
  (Continued)

(58) Field of Classification Search
  CPC .. B29D 99/0096; B65D 41/0421; B65B 55/10
  See application file for complete search history.

(56) References Cited

U.S. PATENT DOCUMENTS 2,738,090 A  3/1952  Davis
4,305,516 A  12/1981  Perne et al.
(Continued)

FOREIGN PATENT DOCUMENTS

CN  1253489 A  5/2000
CN  1688493 A  10/2005
(Continued)

OTHER PUBLICATIONS

International Search Report and Written Opinion for related International Application No. PCT/NL2013/050224 dated Aug. 8, 2013.
(Continued)

*Primary Examiner* — Donald R Spamer
(74) *Attorney, Agent, or Firm* — Troutman Sanders LLP; Ryan A. Schneider

(57) ABSTRACT

A method for providing pre-assembled and sterilized container closure assemblies that are each adapted to be secured onto a container including manufacturing pre-assembled container closure assemblies each adapted to be secured onto a container, injection molding a monolithic spout body of thermoplastic material, injection molding a manually removable rotational cap, securing the cap onto the neck of the spout body in a closed position of the cap, submerging each of the pre-assembled container closure assemblies in a bath of sterilizing liquid, and removing the container closure assemblies from the bath of sterilizing liquid, and allowing the sterilizing liquid to drain. A pre-assembled container closure assembly adapted to be secured onto a container is also disclosed.

17 Claims, 9 Drawing Sheets

(51) Int. Cl.
 B65D 75/58 (2006.01)
 B65D 41/32 (2006.01)
 B65D 41/34 (2006.01)
 B65B 55/10 (2006.01)
 B29D 99/00 (2010.01)

(52) U.S. Cl.
 CPC ..... *B65D 41/0421* (2013.01); *B65D 41/0428* (2013.01); *B65D 41/325* (2013.01); *B65D 41/34* (2013.01); *B65D 41/3414* (2013.01); *B65D 75/5883* (2013.01); *B29K 2023/06* (2013.01); *B65D 2101/003* (2013.01); *B65D 2101/0046* (2013.01); *B65D 2575/586* (2013.01)

(56) References Cited

U.S. PATENT DOCUMENTS

| | | | | |
|---|---|---|---|---|
| 4,409,775 | A | * | 10/1983 | Brody .................. A23B 7/10 |
| | | | | 134/152 |
| 5,389,384 | A | * | 2/1995 | Jooste .................. A01N 59/00 |
| | | | | 424/661 |
| 6,264,052 | B1 | | 7/2001 | Schmitz |
| 2005/0045657 | A1 | * | 3/2005 | Smiley .............. B65D 1/0223 |
| | | | | 222/215 |

| | | |
|---|---|---|
| 2009/0134116 A1 | 5/2009 | Roussy et al. |
| 2010/0116771 A1 | 5/2010 | Cerveny |
| 2013/0299495 A1 | 11/2013 | Last et al. |

FOREIGN PATENT DOCUMENTS

| | | |
|---|---|---|
| CN | 101415614 A | 4/2009 |
| DE | 19700308 A1 | 7/1998 |
| DE | 102007029541 A1 | 1/2009 |
| FR | 2493274 A1 | 5/1982 |
| JP | 10181758 A | 7/1998 |
| JP | 2000289763 A | 10/2000 |
| JP | 2004149173 A | 5/2004 |
| JP | 2009280251 A | 12/2009 |
| WO | 9849865 A1 | 11/1998 |
| WO | 03066461 A1 | 8/2003 |
| WO | 2004018317 A2 | 3/2004 |
| WO | 2004045977 A1 | 6/2004 |
| WO | 2010086609 A1 | 8/2010 |

OTHER PUBLICATIONS

Search Report and Written Opinion for related Netherlands Application No. NL2008558 prepared Jan. 8, 2013.

* cited by examiner

CONTAINER CLOSURE ASSEMBLIES

CROSS-REFERENCE TO RELATED APPLICATIONS

This application is a US divisional application of U.S. Ser. No. 14/388,288 filed 26 Sep. 2014, which divisional application is a US National Stage of International Application No. PCT/NL2013/050224, filed 27 Mar. 2013, which claims the benefit of NL Application No. 2008558, filed 29 Mar. 2012, each herein fully incorporated by reference.

BACKGROUND OF THE INVENTION

Field of the Invention

The present invention relates to the field of container closure assemblies that are adapted to be secured onto a container, e.g. a pouch, carton, etc.

BRIEF SUMMARY OF THE INVENTION

The present invention relates to the field of container closure assemblies that are adapted to be secured onto a container, e.g. a pouch, carton, etc.

A first aspect of the invention relates to aseptic packaging wherein it is common that the components of the container package are sterilized in order to kill microorganisms prior to filling and closing of the container. A well-known sterilant is hydrogen peroxide. It is for example known to use hydrogen peroxide as sterilant followed by the use of heat, e.g. hot air (e.g. 60° C. to 125° C.), to increase the effect of the sterilant and to dissipate the residual hydrogen peroxide. Other chemicals that are used as sterilants, primarily for use in packaging for acid food products, include various acids, ethanol, ethylene oxide and peracetic acid.

Many container packages nowadays comprise a container and a pre-assembled container closure assembly with a spout body and a cap secured in closed position thereon. It is then desired to sterilize the closure assembly in pre-assembled state, prior to securing the closure assembly onto the container. The filling of the container can be done prior to or after securing of the closure assembly onto the container.

An example of a known closure assembly is disclosed in WO2004/045977.

At present no satisfactory approaches are available to provide sterilized closure assemblies that are to be secured onto containers after having been sterilized, e.g. for use in a vertical form-fill-sealing line for pouches as is known in the art. In particular sterilization of known closure assemblies is found to be problematic in view of the sterilization process as well as in view of the requirement to leave very little residual sterilant behind on the components of the container package, especially on surfaces that are in contact with the (food) product.

A first aspect of the present invention aims to overcome one or more of the above problems.

According to a first aspect thereof the present invention provides a closure assembly, wherein the interior side of the neck is provided with an inward tapering annular guide surface that extends from the mouth opening downward and that is contacted by the inner sealing ring when the cap is secured onto the spout body and then causes an elastic deformation of the inner sealing ring and/or the neck, and in that the inner sealing ring is embodied such that the first annular sealing surface on the exterior side of the inner sealing ring and a lowermost annular surface of the interior side of the sealing ring adjoin one another directly at an apex which forms the lower edge of the inner sealing ring, and in that—with the cap in closed position—the apex lies against the interior side of the neck, the lowermost annular surface extending from the apex to form an angle of at least 90° with an exposed surface portion of the interior side of the neck directly below the apex so as to avoid the presence of any gap between the inner sealing ring and the neck at the apex.

The inventive closure assembly can advantageously be sterilized by submerging the pre-assembly in a bath of liquid sterilant. The sterilant will then enter the product passage of the spout body via the lower opening of the passage and so contact all of the internal surfaces that are eventually exposed to the product in the finally obtained container package that is filled with product. The contact with the liquid sterilant kills microorganisms. Due to the absence of a gap between the inner sealing ring and the neck of the spout body at the apex no liquid sterilant will remain behind or can be easily removed (e.g. by drying with air) from the passage. In known assemblies, e.g. as in WO2010/086609 or in WO2004/045977, an undesirable amount of sterilant may remain in the gap between the lower edge of the inner sealing ring and the interior side of the neck or be difficult to remove there from, making the sterilization process more complex and time-consuming than with the inventive assembly.

For example in packaging of fruit juice the presence of residual hydrogen peroxide may have adverse effect on the stability of the product in view of ascorbic acid degradation. The present invention allows to avoid this problem in an efficient manner.

The second seal between the spout body and the cap generally enhances the sealing capacity of the closure assembly. In a sterilization by immersion in a bath of liquid sterilant, the second seal also avoids any entry of the sterilant in the region between first and second seal, e.g. close to the mouth opening, which may also be undesirable.

The presence of the inward tapering annular guide surface that extends from the mouth opening downward allows for the lack of a guiding taper at the lower edge of the inner sealing ring as is common in prior art closure assemblies, e.g. as in WO2010/086609, and so allows for easy replacement of the cap onto the neck if desired.

In an embodiment wherein the neck is more rigid than the cap, or at least than the inner sealing ring, then the apex of the inner sealing ring is basically forced inwards upon contact with the guide surface whilst the inner sealing ring is elastically deformed and thereby pre-stressed into its shape in the closed condition of the cap.

In another embodiment the rigidity of the neck and the cap, or at least the inner sealing ring thereof, are comparable so that the contact causes both the neck and the cap, or at least the inner sealing ring, to deform elastically.

It is also envisaged that in an embodiment the neck is less rigid than the cap, or at least than the inner sealing ring thereof, so that the contact between the inner sealing ring and the neck causes an elastic expansion of the neck whilst the inner sealing ring maintains its shape and dimensions. This embodiment, with a soft feel end portion of the neck due to its relative elasticity, may be advantageous in particular when it is envisaged that the neck will be used by consumers as a drinking spout, placing the neck directly between the lips.

In an embodiment the neck is embodied as a drinking spout with an top end portion of the neck being defined on the inside by the inward tapering annular guide surface from the mouth opening downwards and on the outside by an inward tapering outer surface, so that the top end portion has a trumpet or flared shape enhancing the feel when placed between the lips of a consumer drinking directly from the spout.

In an embodiment the exterior of the neck is provided with an outer screw thread and the skirt of the cap with an inner screw thread. In an embodiment the neck and the cap are provided with abutment faces defining the position wherein the cap is screwed onto the neck in its closed position. This is known in the art of screw cap closures.

In an embodiment the neck is provided, below the screw thread or similar on the neck, with an outwardly extending peripheral flange having a circular outer contour and the lower end portion of the skirt of the cap extends—in the closed position of the cap—over the peripheral flange in sealing contact therewith, thereby providing a third seal between the spout body and the cap. The third seal avoids ingress of liquid sterilant between the cap and the neck when the closure assembly is submerged in the liquid. It also avoids ingress of contamination at a later time, e.g. during storage and transport of filled containers.

In an embodiment the cap is provided with an integrally molded tamper-evident band structure below the lower edge of the skirt, which structure allows to evidence the first time opening of the assembly, e.g. as one or more breakable bridges in the structure break upon rotation of the cap in opening direction for the first time.

The tamper evident band structure is preferably embodied such that—when the closure assembly is seen from below—one or more lower openings are present between the tamper evident band structure and the spout body so that any liquid sterilant that entered between the structure and the spout body can easily flow out when the closure assembly is removed from the liquid sterilant bath. This embodiment is advantageous in particular in combination with a third seal as described above with the tamper evident band structure being located below the third seal.

In a further development thereof the tamper evident band structure is embodied such that one or more side openings are present between the lower edge of the cap and portions, e.g. segments, of the structure, e.g. slotted side openings each having a height of at least 1.5 millimeters and a circumferential length of at least 10 millimeters. The presence of one or more side openings in combination with one or more lower openings allows for effective flushing away of any liquid sterilant from the space between the tamper evident band structure and the spout body.

In an embodiment the tamper-evident structure comprises a series of multiple segments, each segment being connected via a first non-frangible connector portion to the skirt at a first end portion of the segment, each segment in its original position being connected at its second end portion via one or more integrally molded frangible bridges to at least an adjacent first end portion of another segment of the tamper-evident ring, wherein the exterior side of the neck has for each segment of the tamper-evident ring a rotation preventing boss, the boss being engageable with a corresponding abutment face that is formed at the second end portion of the segment, so that upon rotating the cap in opening direction by the user from its closed position for the first time, the one or more frangible bridges break thereby evidencing the removal of the cap from the neck.

In an embodiment the base portion of the spout body is adapted to be sealed by means of a sealing technique between opposed film walls of a pouch, e.g. the base portion having thin, flexible sealing walls which project downwards and between them delimit a substantially oval space having a greater cross-section that the inner diameter of the neck. In another embodiment the connection portion is embodied as a solid block that is oval in cross-section transverse to the product passage and with the product passage extending through the block and with the neck extending upwardly from the block.

In an embodiment the connection portion is adapted to be sealed by a sealing technique onto a panel of a carton type container provided with a hole, the connection portion comprising a securing flange that is to be secured onto the carton around the hole, e.g. by heat sealing or adhesive.

A second aspect of the invention relates an improved pre-assembled container closure assembly, the convention assembly exemplified in non-prepublished PCT/NL2011/050656.

In the closure assemblies of this design the breaking of the one or more frangible bridges at the second end of the segment evidences the removal of the cap from the neck.

It has been observed that, in particular for small diameter caps, e.g. caps with a skirt diameter of less than 30 mm at the lower edge of the skirt, e.g. between 10 and 30 mm, the visible evidence of the first time opening is by the breaking is not satisfactory.

The second aspect of the present invention aims to provide a tamper-evident structure that provides improved visual indication of the first time opening of the closure assembly.

The second aspect of the present invention achieves this goal by providing a closure assembly according to the preamble, which is characterized in that the second end portion of each segment is connected via a second non-frangible connector portion to the lower end of the skirt, the second non-frangible connector being integrally molded and being embodied so that upon rotating the cap in opening direction by the user from its closed position for the first time the abutment face formed at the second end portion of the segment contacts the boss resulting in longitudinal loading and subsequent longitudinal compression as well as outward deflection of the segment so as to pass over the boss, in which process the second non-frangible connector is permanently deformed thereby inhibiting the second end of the segment from elastically returning to its original position and thereby holding the second end portion of the second segment in a position outwards of its original position to enhance the visual evidencing of the removal of the cap from the neck.

In a practical embodiment the second non-frangible connector portion is embodied as an inclined rod portion that at one end is integral with the skirt and extends from the one end downward and forward in direction of rotation to an end that is integral with the second end portion of the segment.

The second aspect of the present invention also relates to a cap, e.g. a screw cap, to be secured on the neck of an article, e.g. on the neck of a spout body or on a neck of a container. The cap may e.g. be described as a manually removable rotational cap that is adapted to be secured in closed position thereof on a tubular neck, the cap in the closed position closing the product passage and the cap being manually removable by rotation to open the product passage, wherein the cap has a cap body that is monolithic injection molded of thermoplastic material, which cap body includes a top wall that extends in closed position across the mouth opening, and which cap body includes a downward annular skirt depending from the top wall, the skirt having an interior side, an exterior side and a lower edge, wherein the interior side of the skirt has integrally molded rotational connection means, e.g. a screw thread, wherein the cap furthermore comprises a tamper-evident structure that is integrally molded at the lower edge of the skirt, the tamper-evident structure being composed of a series of multiple segments, each segment being connected via a first non-frangible connector portion to the skirt at a first end portion of the segment, each segment in its original position being connected at its second end portion via one or more integrally molded frangible bridges to at least an adjacent first end portion of another segment of the tamper-evident structure, wherein the exterior side of the neck has for each segment of the tamper-evident structure a rotation preventing boss, the boss being engageable with a corresponding abutment face that is formed at the second end portion of the segment, so that upon rotating the cap in opening direction by the user from its closed position for the first time, the one or more frangible bridges break thereby visually evidencing the removal of the cap from the neck, characterized in that the second end portion of each segment is connected via a second non-frangible connector portion to the lower end of the skirt of the cap, the second non-frangible connector being integrally molded and being embodied so that upon rotating the cap in opening direction by the user from its closed position for the first time the abutment face formed at the second end portion of the segment contacts the boss resulting in longitudinal loading and subsequent longitudinal compression as well as outward deflection of the segment so as to pass over the boss, in which process the second non-frangible connector is permanently deformed thereby inhibiting the second end of the segment from elastically returning to its original position and thereby holding the second end portion of the second segment in a position outwards of its original position to enhance the visual evidencing of the removal of the cap from the neck.

It will be appreciated that the closure assembly and cap, e.g. screw cap, of the second aspect of the invention can be embodied either with or without the features of the assembly according to a first aspect of the invention.

These and other objects, features and advantages of the present invention will become more apparent upon reading the following specification in conjunction with the accompanying drawing figures.

DETAIL DESCRIPTION OF THE INVENTION

Figure 1:
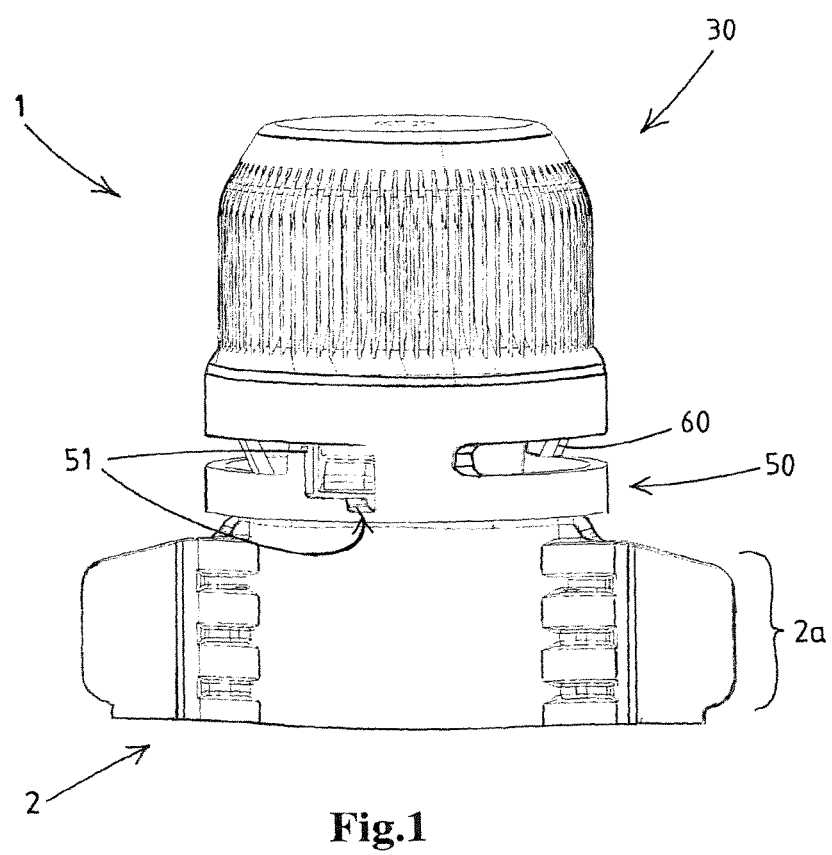
FIG. 1 shows in side view an example of a pre-assembled closure assembly according to the first and second aspect of the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a, " "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

With reference to FIGS. 1-8 an example of a pre-assembled container closure assembly according to the first and second aspect of the invention will be discusses, as illustration of the invention and of optional and/or preferred additional features thereof.

The pre-assembled closure assembly 1 is ready to be secured onto a container, for example (as here) between opposed film walls of a collapsible pouch container, e.g. for a food product, e.g. a fruit product.

In general the closure assembly 1 is assembled from a spout body 1 and a cap 30.

The spout body 2 is a monolithic injection molded spout body of thermoplastic material, e.g. of polyethylene PE.

The spout body 2 having at a lower end thereof a base portion 2a that is adapted to secure the assembly onto a container. As will be appreciated by the skilled person in this example the base portion 2a is adapted to be sealed, e.g. with heat sealing jaws, between opposed film walls of a pouch.

The spout body 2 has above the base portion 2a, at an upper end of the body 2, a tubular neck 4 which extends upward in an axial direction of the neck 4.

The neck 4 has an interior side 5 delimiting at least a section of a product passage 6 that extends from a lower product passage opening 7 through the spout body 2 to a mouth opening 8 at a top end of the neck 4. For example the passage 6 has a diameter of 8-10 millimeters.

The neck has an exterior side 9.

The cap 30 is a manually removable rotational cap that is secured in closed position thereof on the tubular neck 4 of the spout body.

In this closed position the cap 30 forms the sole closure of the product passage 6 through the spout body 2. There is e.g. no foil seal fitted over the mouth opening underneath the cap 30. Neither is there for example a pull ring type barrier halfway in the tubular neck as known in the art.

The cap 30 is manually removable by rotation to open the product passage 6. The cap 30 can be replaced if it is desired to close the passage 6 again later.

The cap 30 has a cap body that is monolithic injection molded of thermoplastic material, e.g. of polyethylene PE.

The cap body includes a top wall 31 that extends in closed position across the mouth opening 8 of the spout body.

The cap body further includes a downward annular skirt 32 that depends from the top wall 31. The skirt has an interior side 32a, an exterior side 32b and a lower edge 32c. The exterior side is in a practical embodiment provided with one or more gripping face or formations, e.g. ribbed as in this example. However the skirt can also be surrounded by yet another skirt, spaced from the skirt 32, e.g. to obtain an anti-chocking design of the cap, or with some other anti-choking feature externally of the skirt.

The cap is provided, as an extension of the lower edge of the skirt of the cap 3, with a tamper-evident band structure 50 that allows to evidence the first time opening of the assembly as one or more breakable bridges (here at 51) of the structure break upon rotation of the cap in opening direction for the first time.

The exterior side of the neck 4 and the interior side 32b of the skirt 32 each have integrally molded and cooperating rotational connection means, here first and second screw threads 10, 33 on the neck 4 and the skirt 32 respectively, The cap body further includes an integrally molded annular inner sealing ring 40 depending from the top wall 31. This ring 40 is concentric with respect to the skirt 32. The inner sealing ring 40 has an interior side, an exterior side, and a lower edge as will be discussed in more detail below.

The exterior side of the sealing ring 40 includes a first annular sealing surface 41 that—with the cap 30 in closed position—is in sealing contact with a corresponding first annular sealing surface 12 of the interior side of the neck 4 to provide a first seal between the cap and the spout body 2.

Figure 5:
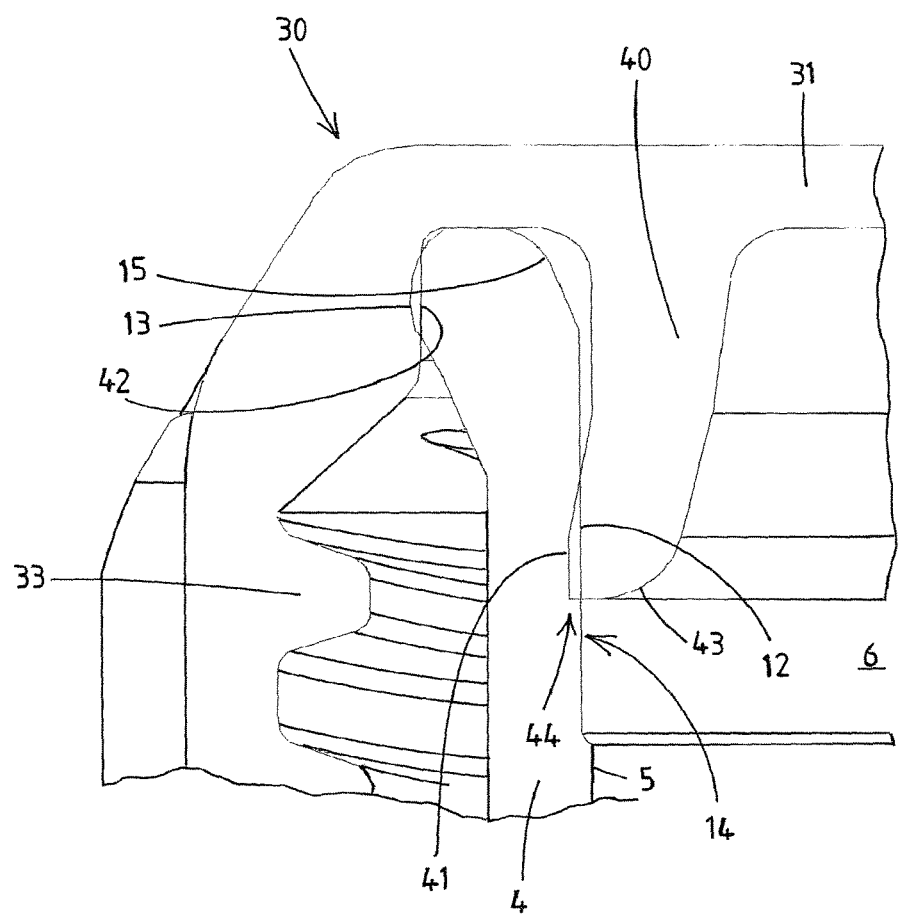
FIG. 5 shows in cross-sectional detail a portion of the spout body and the cap of the closure assembly of FIGS. 1 and 2.

The exterior side of the neck at or near the top end thereof forms a second annular sealing surface 13 that—with the cap in closed position—is in sealing contact with a corresponding second annular sealing surface 42 of the cap 30 to provide a second seal between the cap and the spout body 2. In FIG. 5 the top end of the neck 5 is shown to partly overlap with the top end of the skirt 32, which is a common approach to show the originally molded shape of the part of the neck and the elastic deformation of the part inwards in order to fit within the skirt 32. This deformation results in a desired pre-stress at the location.

As can be seen the first seal is located—when seen in axial direction of the neck—below the second seal.

The interior side of the neck 4 is provided with an inward tapering annular guide surface 15 that extends from the mouth opening 8 downward and that is contacted by the inner sealing ring 40 when the cap 30 is secured onto the spout body 2 and then causes an elastic deformation of the inner sealing ring 40 to a diameter corresponding to the first annular sealing surface 12 of the interior side of the neck 4.

As can be best seen in FIG. 5 the inner sealing ring 40 is embodied such that the first annular sealing surface 41 on the exterior side of the inner sealing ring 40 and a lowermost annular surface 43 of the interior side of the sealing ring 40 adjoin one another directly at an apex 44 which forms the lower edge of the inner sealing ring. As is common the ring 40 is depicted in FIG. 5 with the shape and dimensions as it is formed by injection molding. The partly overlap with the neck 4 in this figure illustrates the required deformation of the sealing ring 40 in order to fit within the neck as it is here assumed that the cap, at least the ring 40, is less rigid than the neck. This deformation result is a desired pre-stressing of the ring 40 against the inside of the neck. As explained it is e.g. envisaged that the cap may be more rigid than the neck so that the neck will then deform and the ring 40 will maintain its shape and dimensions as obtained by injection molding.

The FIG. 5 illustrates that—with the cap in closed position on the spout body—the apex 44 lies against the interior side 5 of the neck 4.

The lowermost annular surface 43 extends from this apex 44 inward, and preferably upward, to form an angle of at least 90° with an exposed surface portion (here at 14) of the interior side of the neck 4 directly below the apex 44 so as to avoid the presence of any gap between the inner sealing ring 40 and the neck at the apex 44. As explained above this avoids the presence of a dead space wherein liquid sterilant could be remain after completion of the sterilization process. As explained this advantageously allows a sterilization of the closure assembly by submerging the assembly in a bath of liquid sterilant, e.g. comprising hydrogen peroxide. After submerging the assembly can be removed from the bath, and the sterilant allowed to drain via the lower opening of the passage 6. Then a drying step, e.g. using heated air, may be performed, e.g. directed into the passage to dry out any remaining residue of sterilant. By absence of a gap as discussed, this drying step can be performed efficiently with a reliable removal of the residual sterilant.

As can be seen the lowermost annular surface 43 here extends from the apex 44 as an inwardly and upwardly curved surface which is preferred due to the resulting stability of the ring at the apex.

Figure 2:
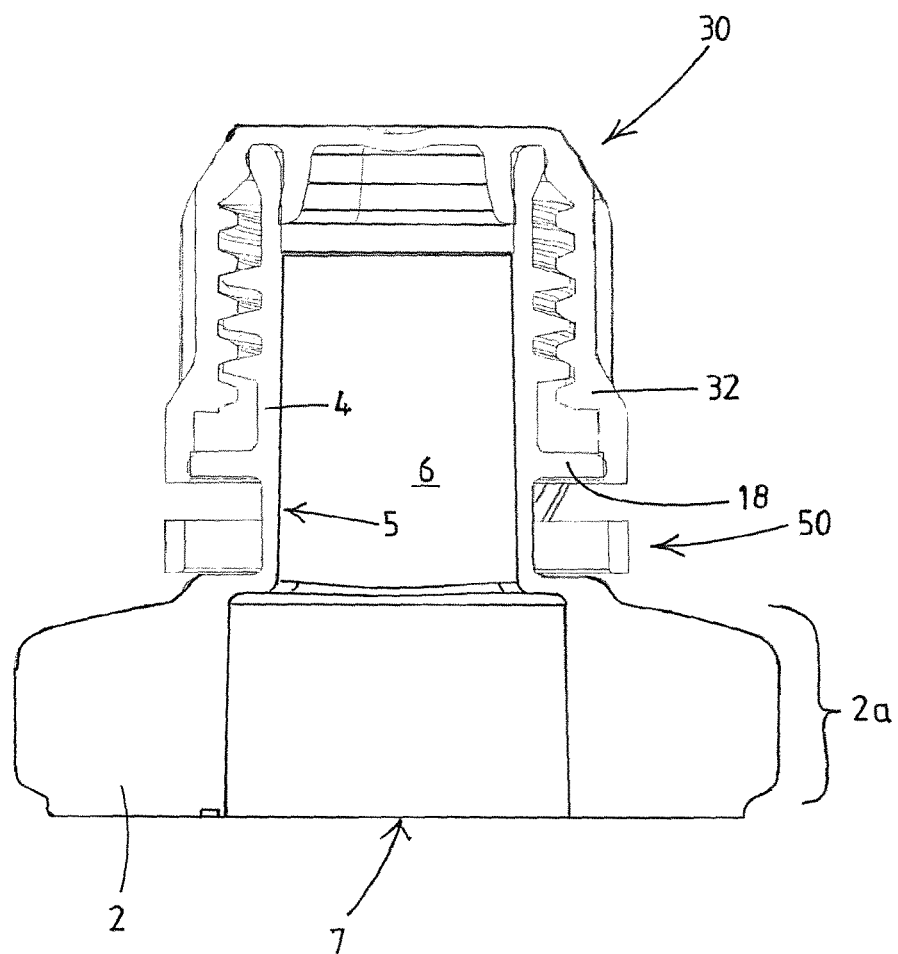
FIG. 2 shows the closure assembly of FIG. 1 in a cross-section.
Figure 3:
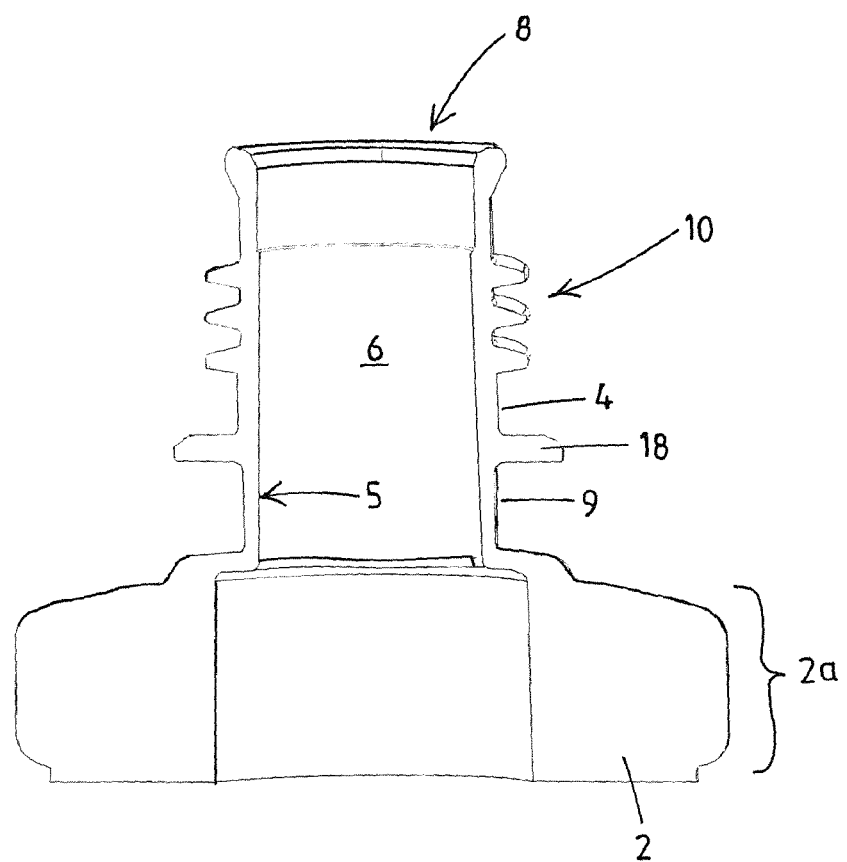
FIG. 3 shows the spout body of the closure assembly of FIGS. 1 and 2 in cross-section.
Figure 4:
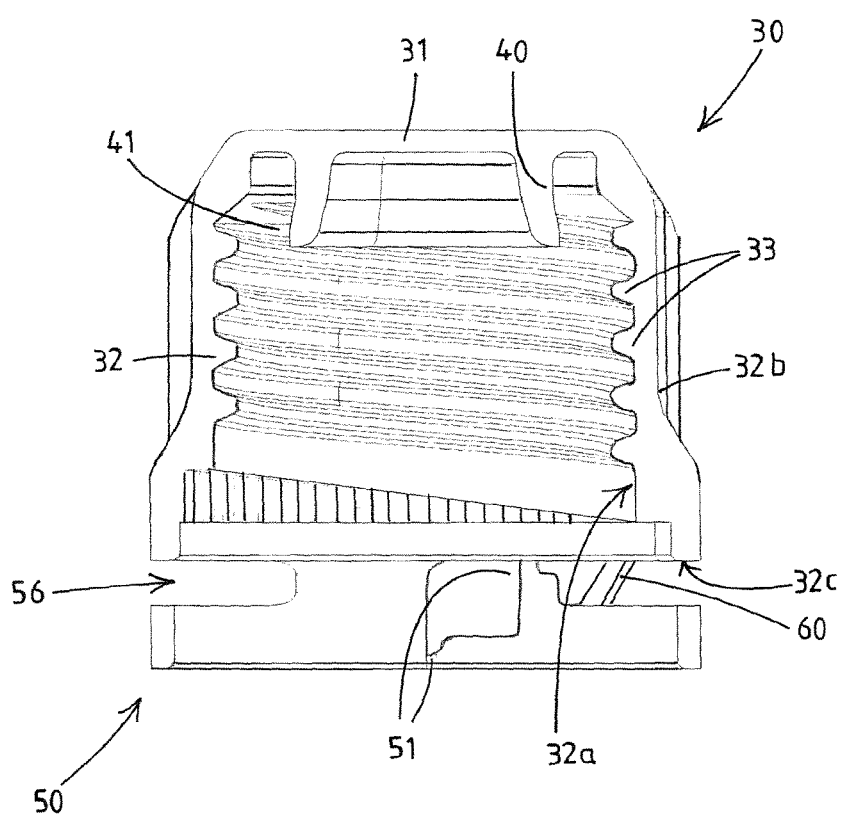
FIG. 4 shows the cap of the closure assembly of FIGS. 1 and 2 in cross-section.

As can be seen in FIG. 2 the neck 4 is provided with an outwardly extending peripheral flange 18 having a circular outer contour. The lower end portion of the skirt 32 of the cap 30 extends—in the closed position of the cap—over the peripheral flange 18 and is in sealing contact therewith, thereby providing a third seal between the spout body 2 and the cap 30. The screw threads are located above this third seal, in the area between the second and third seal, so that liquid sterilant will not reach above the third seal between the cap and the neck.

The tamper evident band structure comprises a series of multiple segments, here two 50*a*, 50*b*, the segments extending in circumferential direction about the neck. Each segment is connected via a first non-frangible connector portion 52*a*, *b* to the skirt of the cap at a first end portion of the segment. Each segment in its original position is connected at its second end portion via one or more integrally molded frangible bridges 51 to at least an adjacent first end portion of another segment of the tamper-evident ring, here also one bridge connecting to the lower edge of the skirt.

Figure 6:
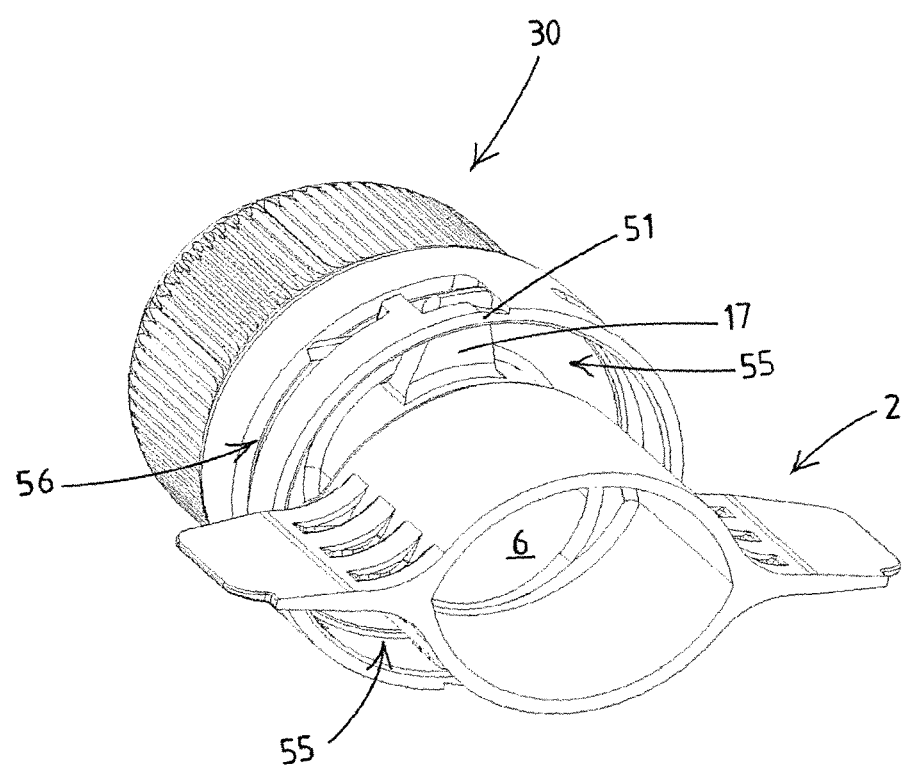
FIG. 6 shows the closure assembly of FIG. 1 in a perspective view from below.
Figure 7:
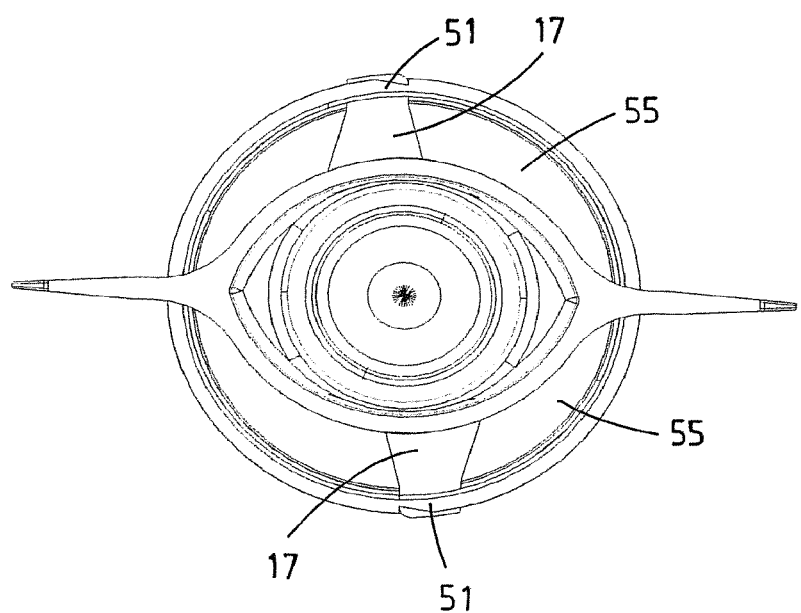
FIG. 7 shows the closure assembly of FIG. 1 in a view from below.

The exterior side of the neck has for each segment 50*a*, *b* of the tamper-evident structure a rotation preventing boss 17, which can also be seen in FIGS. 6 and 7. This boss is engageable with a corresponding abutment face 54 that is formed at the second end portion of the segment, so that upon rotating the cap in opening direction by the user from its closed position for the first time, the one or more frangible bridges 51 break thereby evidencing the removal of the cap from the neck.

As can best be seen in FIG. 6 the tamper evident structure is embodied such that—when the closure assembly is seen from below—one or more lower openings 55 are present between the tamper evident band structure, here the segments 50*a*, 50*b*, and the spout body so that any liquid sterilant that entered between the structure 50 and the spout body can easily flow out when the closure assembly is removed from the liquid sterilant bath. This embodiment is advantageous in particular in combination with the third seal as described above with the tamper evident band structure being located below the third seal.

As can be seen the tamper evident band structure with its segments 50*a*, 50*b* is embodied such that a slot shaped side opening 56 is present between the lower edge of the skirt of the cap and each of the segments of the structure, e.g. slotted side openings each having a height of at least 1.5 millimeters and a circumferential length of at least 10 millimeters. The presence of one or more side openings 56 in combination with one or more lower openings 55 allows for effective flushing away of any liquid sterilant from the space between the tamper evident band structure and the spout body.

Figure 8A:
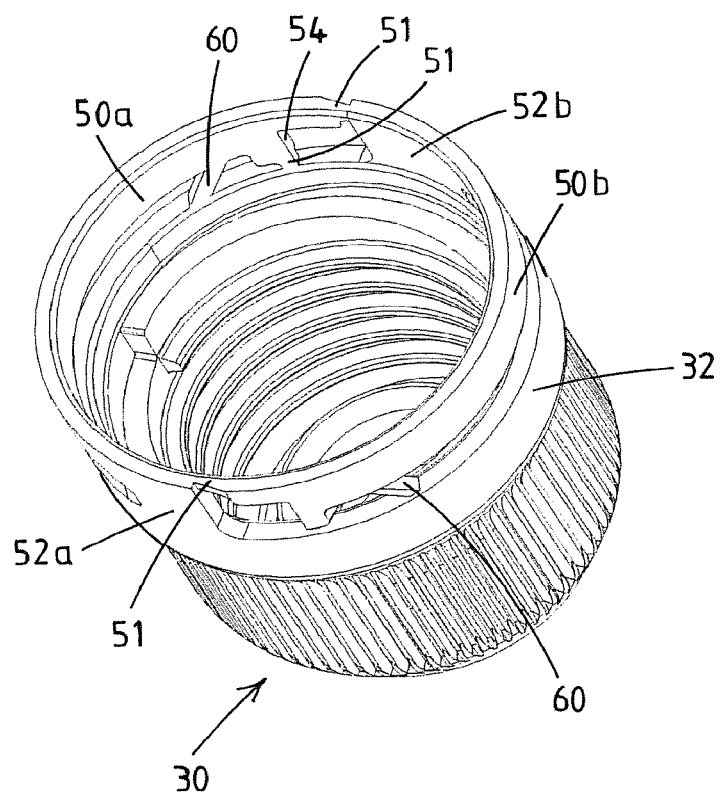
FIGS. 8a, 8b show the cap of the closure assembly of FIG. 1 in perspective view from below to illustrate the second aspect of the invention.
Figure 8B:
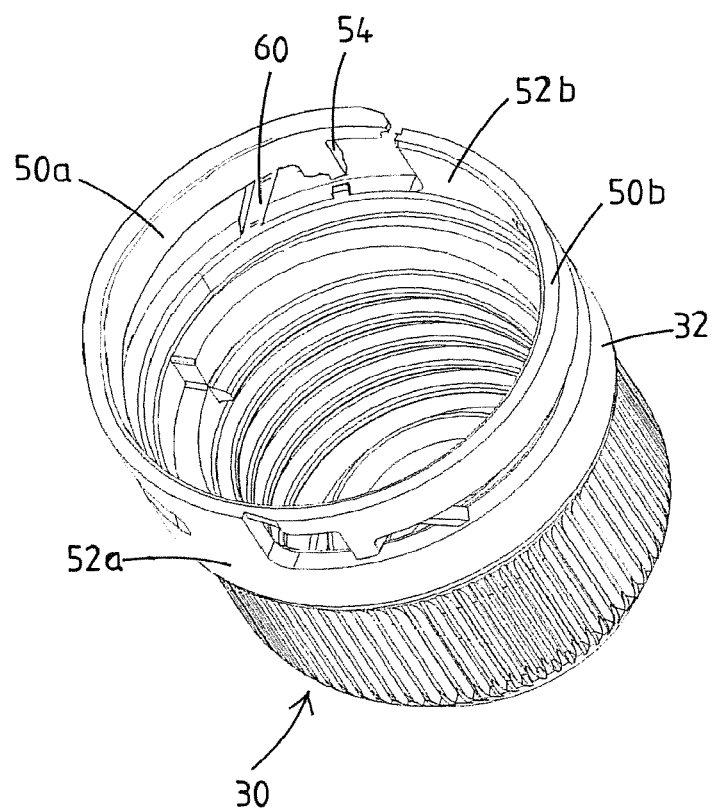

FIGS. 8*a* and 8*b* illustrate the second aspect of the invention.

FIG. 8*a* shows the cap 30 as it has been injection molded with the tamper-evident structure 50 integrally molded at the lower edge of the skirt of the cap. As already discussed each segment 50*a*, *b* is connected via a first non-frangible connector portion 52*a*, *b* to the skirt at a first end portion of the segment. Also each segment—in its original position as shown in FIG. 8*a*—is connected at its second end portion via one or more integrally molded frangible bridges 51 to at least an adjacent first end portion of another segment of the tamper-evident structure, here by one bridge 51 and also by one bridge 51 to the lower edge of the skirt. In another embodiment two bridges 51 are connected to the other segment, with no frangible bridge to the skirt, e.g. with the boss 17 arranged between two parallel bridges.

Upon rotating the cap in opening direction by the user from its closed position for the first time the boss 17 comes into contact with a corresponding abutment face 54 that is formed at the second end portion of the segment, so that the one or more frangible bridges 51 break thereby visually evidencing the removal of the cap from the neck.

The second end portion of each segment 50*a*, *b* is connected via a second non-frangible connector portion 60 to the lower end of the skirt of the cap. This second non-frangible connector portion 60 is integrally molded as part of the cap. The connector portion 60 is embodied so that upon rotating the cap in opening direction by the user from its closed position for the first time the abutment face 54 formed at the second end portion of the segment contacts the boss 17 resulting in longitudinal loading and subsequent longitudinal compression as well as outward deflection of the segment so as to pass over the boss 17, in which process the second non-frangible connector portion 60 is permanently deformed (shown for one of the segments in FIG. 8*b*) thereby inhibiting the second end of the segment from elastically returning to its original position and thereby holding the second end portion of the second segment in a position outwards of its original position to enhance the visual evidencing of the removal of the cap from the neck.

Preferably only a single non-frangible connector portion 60 is present an a second end portion of a segment, with no further frangible or non-frangible connector portions in the area between the first connector portion 52*a*, *b* and the associated single connector portion 60. Thereby a continuous slot shaped opening 56 is formed between connector portion 52*a*, *b* and the associated portion 60.

As is preferred the second non-frangible connector portion 60 is embodied as an inclined rod portion that at one end is integral with the skirt and extends from the one end downward and forward in direction of rotation to an end that is integral with the second end portion of the segment. In the mentioned process this rod will be subjected to bending and torsional forces, with the result that it will assume an outward directed orientation compared to its original orientation and so restrain the end of the segment from returning to its original position.

For example the rod portion 60 has a rectangular or square cross-section, e.g. of between 0.5 mm×0.5 mm and 1.5 mm×1.5 mm.

Preferably the first non-frangible connector portion 52*a*, *b* has a cross-section that is a multiple of the cross-section of the second non-frangible connector portion, e.g. at least three times the cross-section, e.g. with a circumferential length of at least 3 mm.

What is claimed is:

1. A method for providing pre-assembled and sterilized container closure assemblies that are each adapted to be secured onto a container, the method comprising:
   manufacturing pre-assembled container closure assemblies each adapted to be secured onto a container, the manufacturing comprising:
   injection molding a monolithic spout body of thermoplastic material, the spout body having at a lower end thereof a base portion that is adapted to secure the assembly onto a container and the body having at an upper end thereof a tubular neck extending in an axial direction thereof;
   which tubular neck has an exterior side and an interior side;
   the interior side delimiting at least a section of a product passage that extends from a lower product passage opening through the spout body to a mouth opening at a top end of the neck, wherein the interior side of the neck is provided with an inward tapering annular guide surface that extends from the mouth opening downward;
   wherein the exterior side of the neck has integrally molded first rotational connection means;

wherein the exterior side of the tubular neck is further provided with an outwardly extending peripheral flange having a circular outer contour; and wherein the exterior side of the neck at or near the top end thereof forms a second annular sealing surface;

injection molding a manually removable rotational cap, which cap has a monolithic cap body of thermoplastic material, which cap body includes a top wall that extends in closed position across the mouth opening, and which cap body includes a downward annular skirt depending from the top wall, the skirt having an interior side, an exterior side and a lower edge;

wherein the interior side of the skirt has integrally molded second rotational connection means;

wherein the cap body further includes an integrally molded annular inner sealing ring depending from the top wall, concentric with respect to the skirt, the inner sealing ring having an interior side and an exterior side;

wherein the exterior side of the inner sealing ring includes a first annular sealing surface; and wherein the inner sealing ring is embodied such that the first annular sealing surface on the exterior side of the inner sealing ring and a lowermost annular surface of the interior side of the inner sealing ring adjoin one another directly at an apex; and securing the cap onto the neck of the spout body in a closed position of the cap;

wherein the securing of the cap onto the neck causes the first and second rotational connection means of the spout body and the cap respectively to cooperate such that the cap is manually removable by rotation thereof to open the product passage of the spout body;

wherein the securing of the cap onto the neck causes elastic deformation of at least one of the inner sealing ring and the tubular neck due to the inner sealing ring contacting the inward tapering annular guide surface;

wherein, in the closed position of the cap, the first annular sealing surface on the exterior side of the inner sealing ring is in sealing contact with a corresponding first annular sealing surface of the interior side of the tubular neck and provides a first seal between the cap and the spout body;

wherein, in the closed position of the cap, the second annular sealing surface on the exterior side of the neck is in sealing contact with a corresponding second annular sealing surface of the cap and provides a second seal between the cap and the spout body;

wherein, in the closed position of the cap, the apex lies against the interior side of the tubular neck and the lowermost annular surface forms an angle of at least 90° with an exposed surface portion of the interior side of the tubular neck directly below the apex thereby avoiding the presence of any gap between the inner sealing ring and the tubular neck at the apex; and wherein, in the closed position of the cap, a lower end portion of the skirt of the cap extends over the outwardly extending peripheral flange of the tubular neck and is in sealing contact therewith, thereby providing a third seal between the spout body and the cap;

submerging each of the pre-assembled container closure assemblies in a bath of sterilizing liquid, such that the sterilizing liquid enters the product passage of the spout body via the lower opening thereof, wherein the sterilizing liquid is hindered from entering between the skirt of the cap and the tubular neck of the spout body by means of the first seal and of the third seal; and removing the container closure assemblies from the bath of sterilizing liquid, and allowing the sterilizing liquid to drain from the product passage of the spout body via the lower opening.

2. The method according to claim 1, wherein the submerging of each of the pre-assembled container closure assemblies in a bath of sterilizing liquid comprises conveying the closure assemblies in succession along a predetermined path through a bath of sterilizing liquid by means of a conveyor mechanism.

3. The method according to claim 1, wherein the injection molding of the cap comprises injection molding the cap body with an integrally molded tamper-evident band structure below the lower edge of the skirt, wherein the integrally molded tamper-evident band structure allows to evidence a first time opening of the pre-assembled container closure assembly, and wherein the tamper evident band structure is embodied such that, when the closure assembly is seen from below, one or more lower openings are present between the tamper evident band structure and the spout body, wherein sterilizing liquid drains via the one or more lower openings upon removal of the container closure assemblies from the bath of sterilizing liquid.

4. The method according to claim 1, wherein the injection molding of the cap comprises injection molding the cap body with an integrally molded tamper-evident band structure below the lower edge of the skirt, wherein the integrally molded tamper-evident band structure allows to evidence a first time opening of the pre-assembled container closure assembly, and wherein the tamper evident band structure is embodied such that one or more side openings are present between the lower edge of the skirt and the tamper evident band structure, wherein sterilizing liquid drains via the one or more side openings upon removal of the container closure assemblies from the bath of sterilizing liquid.

5. A method for providing pre-assembled container closure assemblies that are each adapted to be secured onto a container, the method comprising:

submerging pre-assembled container closure assemblies comprising a monolithic injection molded spout body of thermoplastic material in a bath of sterilizing liquid, the liquid entering a product passage of the spout body via a lower product passage opening; and removing the container closure assemblies from the bath, allowing the sterilizing liquid to drain from the product passage of the spout body via the lower product passage opening;

wherein at least one of the pre-assembled container closure assemblies comprises:

the monolithic injection molded spout body of thermoplastic material, the spout body having at a lower end thereof a base portion that is adapted to secure the assembly onto a container and the body having at an upper end thereof a tubular neck extending in an axial direction thereof;

which tubular neck has an exterior side and an interior side; and the interior side delimiting at least a section of the product passage that extends from the lower product passage opening through the spout body to a mouth opening at a top end of the tubular neck; and a manually removable rotational cap that is secured in closed position thereof on the tubular neck, the cap in the closed position forming the sole closure of the product passage through the spout body and the cap being manually removable by rotation to open the product passage;

wherein the cap has a cap body that is monolithic injection molded of thermoplastic material, which cap body includes a top wall that extends in closed position across the mouth opening, and which cap body includes a downward annular skirt depending from the top wall, the skirt having an interior side, an exterior side and a lower edge;

wherein the exterior side of the tubular neck and the interior side of the skirt each have integrally molded and cooperating rotational connection means;

wherein the cap body further includes an integrally molded annular inner sealing ring depending from the top wall, concentric with respect to the skirt, the inner sealing ring having an interior side and an exterior side;

wherein the exterior side of the inner sealing ring includes a first annular sealing surface that—with the cap in closed position—is in sealing contact with a corresponding first annular sealing surface of the interior side of the tubular neck to provide a first seal between the cap and the spout body;

wherein the exterior side of the tubular neck at or near the top end thereof forms a second annular sealing surface that—with the cap in closed position—is in sealing contact on a corresponding second annular sealing surface of the cap to provide a second seal between the cap and the spout body;

wherein the interior side of the tubular neck is provided with an inward tapering annular guide surface that extends from the mouth opening downward and that is contacted by the inner sealing ring when the cap is secured onto the spout body and then causes an elastic deformation of the inner sealing ring and/or the tubular neck;

wherein the tubular neck is provided with an outwardly extending peripheral flange having a circular outer contour, and wherein the lower end portion of the skirt of the cap extends-in the closed position of the cap—over the peripheral flange and is in sealing contact therewith, thereby providing a third seal between the spout body and the cap; and wherein in that the inner sealing ring is embodied such that the first annular sealing surface on the exterior side of the inner sealing ring and a lowermost annular surface of the interior side of the inner sealing ring adjoin one another directly at an apex, and in that—with the cap in closed position—the apex lies against the interior side of the tubular neck, the lowermost annular surface extending from the apex to form an angle of at least 90° with an exposed surface portion of the interior side of the tubular neck directly below the apex so as to avoid the presence of any gap between the inner sealing ring and the tubular neck at the apex.

6. The method according to claim 5, wherein the lowermost annular surface extends from the apex as an inwardly and upwardly curved surface.

7. The method according to claim 5, wherein the integrally molded and cooperating rotational connection means of the exterior side of the tubular neck and the interior side of the skirt comprise first and second screw threads on the tubular neck and skirt, respectively.

8. The method according to claim 5, wherein the cap is provided below the lower edge of the skirt with an integrally molded tamper—evident band structure that allows to evidence a first time opening of the at least one pre-assembled container closure assembly.

9. The method according to claim 8, wherein the tamper-evident band structure comprises one or more breakable bridges that break upon rotation of the cap in opening direction for the first time.

10. The method according to claim 8, wherein the tamper evident band structure is embodied such that one or more side openings are present between the lower edge of the skirt and portions of the structure.

11. The method according to claim 10, wherein the one or more side openings present between the lower edge of the skirt and portions of the structure comprise slotted side openings each having a height of at least 1.5 millimeters and a circumferential length of at least 10 millimeters.

12. The method according to claim 5 further comprising conveying each of the pre-assembled container closure assemblies in succession along a predetermined path through the bath of liquid sterilant in a sterilizing apparatus having a conveyor mechanism.

13. A method for providing pre-assembled sterilized container closure assemblies that are each adapted to be secured onto a container, the method comprising:

manufacturing pre-assembled container closure assemblies having a monolithic spout body of thermoplastic material, a lower product passage opening and a product passage;

submerging the pre-assembled container closure assemblies in a bath of sterilizing liquid, the liquid entering the product passage of the spout body via the lower product passage opening; and removing the pre-assembled container closure assemblies from the bath, allowing the sterilizing liquid to drain from the product passage of the spout body via the lower product passage opening;

wherein manufacturing pre-assembled container closure assemblies comprises:

injection molding the monolithic spout body of thermoplastic material, the spout body having at a lower end thereof a base portion that is adapted to secure the assembly onto a container and the body having at an upper end thereof a tubular neck extending in an axial direction thereof;

which tubular neck has an exterior side and an interior side;

the interior side delimiting at least a section of the product passage that extends from the lower product passage opening through the spout body to a mouth opening at a top end of the neck, wherein the interior side of the neck is provided with an inward tapering annular guide surface that extends from the mouth opening downward;

wherein the exterior side of the neck has integrally molded first rotational connection means;

wherein the exterior side of the tubular neck is further provided with an outwardly extending peripheral flange having a circular outer contour; and wherein the exterior side of the neck at or near the top end thereof forms a second annular sealing surface;

injection molding a manually removable rotational cap, which cap has a monolithic cap body of thermoplastic material, which cap body includes a top wall that extends in closed position across the mouth opening, and which cap body includes a downward annular skirt depending from the top wall, the skirt having an interior side, an exterior side and a lower edge;

wherein the interior side of the skirt has integrally molded second rotational connection means;

wherein the cap body further includes an integrally molded annular inner sealing ring depending from the top wall, concentric with respect to the skirt, the inner sealing ring having an interior side and an exterior side;

wherein the exterior side of the inner sealing ring includes a first annular sealing surface; and wherein the inner sealing ring is embodied such that the first annular sealing surface on the exterior side of the inner sealing ring and a lowermost annular surface of the interior side of the inner sealing ring adjoin one another directly at an apex; and securing the cap onto the neck of the spout body in a closed position of the cap;

wherein the securing of the cap onto the neck causes the first and second rotational connection means of the spout body and the cap respectively to cooperate such that the cap is manually removable by rotation thereof to open the product passage of the spout body;

wherein the securing of the cap onto the neck causes elastic deformation of at least one of the inner sealing ring and the tubular neck due to the inner sealing ring contacting the inward tapering annular guide surface;

wherein, in the closed position of the cap, the first annular sealing surface on the exterior side of the inner sealing ring is in sealing contact with a corresponding first annular sealing surface of the interior side of the tubular neck and provides a first seal between the cap and the spout body;

wherein, in the closed position of the cap, the second annular sealing surface on the exterior side of the neck is in sealing contact with a corresponding second annular sealing surface of the cap and provides a second seal between the cap and the spout body;

wherein, in the closed position of the cap, the apex lies against the interior side of the tubular neck and the lowermost annular surface forms an angle of at least 90° with an exposed surface portion of the interior side of the tubular neck directly below the apex thereby avoiding the presence of any gap between the inner sealing ring and the tubular neck at the apex; and wherein, in the closed position of the cap, a lower end portion of the skirt of the cap extends over the outwardly extending peripheral flange of the tubular neck and is in sealing contact therewith, thereby providing a third seal between the spout body and the cap; and wherein the step of submerging comprises submerging each of the pre-assembled container closure assemblies in the bath of sterilizing liquid, the liquid entering the product passage of the spout body via the lower opening thereof.

14. The method according to claim 13 further comprising conveying each of the pre-assembled container closure assemblies in succession along a predetermined path through the bath of liquid sterilant in a sterilizing apparatus having a conveyor mechanism.

15. The method according to claim 13, wherein the lowermost annular surface extends from the apex as an inwardly and upwardly curved surface.

16. The method according to claim 13, wherein the cap is provided below the lower edge of the skirt with an integrally molded tamper-evident band structure that allows to evidence a first time opening of the pre-assembled container closure assemblies.

17. The method according to claim 13, wherein the integrally molded and cooperating rotational connection means of the exterior side of the tubular neck and the interior side of the skirt comprise first and second screw threads on the tubular neck and skirt, respectively.

* * * * *